(12) United States Patent
Bar-On et al.

(10) Patent No.: US 7,102,570 B2
(45) Date of Patent: Sep. 5, 2006

(54) MOBILE COMMUNICATIONS STATIONS METHODS AND SYSTEMS

(75) Inventors: David Bar-On, Rehovot (IL); Mark Shahaf, Ashdod (IL); Salomon Serfaty, Doar Gaash (IL); Baruh Hason, Tel Aviv (IL)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/508,297

(22) PCT Filed: Mar. 3, 2003

(86) PCT No.: PCT/EP03/02221

§ 371 (c)(1),
(2), (4) Date: Sep. 20, 2004

(87) PCT Pub. No.: WO03/083504

PCT Pub. Date: Oct. 9, 2003

(65) Prior Publication Data

US 2005/0159174 A1 Jul. 21, 2005

(30) Foreign Application Priority Data

Mar. 28, 2002 (GB) ................................. 0207344.3

(51) Int. Cl.
*G01S 3/02* (2006.01)
(52) U.S. Cl. ...................................... 342/465; 342/457
(58) Field of Classification Search ................ 342/450, 342/457, 463, 465; 455/456.1, 456.6
See application file for complete search history.

(56) References Cited

U.S. PATENT DOCUMENTS

| | | | | |
|---|---|---|---|---|
| 5,973,643 A | * | 10/1999 | Hawkes et al. | 342/457 |
| 6,040,800 A | | 3/2000 | Raith et al. | |
| 6,160,511 A | * | 12/2000 | Pfeil et al. | 342/457 |
| 6,236,365 B1 | * | 5/2001 | LeBlanc et al. | 342/457 |
| 6,275,186 B1 | * | 8/2001 | Kong | 342/363 |
| 6,526,039 B1 | * | 2/2003 | Dahlman et al. | 370/350 |
| 2003/0052823 A1 | * | 3/2003 | Carroll | 342/465 |

FOREIGN PATENT DOCUMENTS

| | | |
|---|---|---|
| EP | 0964265 A2 | 12/1999 |
| EP | 01180696 A2 | 2/2002 |
| GB | 2316823 A | 8/1996 |

* cited by examiner

*Primary Examiner*—Dao Phan
(74) *Attorney, Agent, or Firm*—Valerie M. Davis; Indira Saladi

(57) ABSTRACT

A method for use in a mobile communication system for estimating the location of a target mobile station (MS) which includes receiving signals from the target MS (N) at a plurality of receivers (MS1, MS2, MS3) in different locations and calculating the location of the target MS (N) from information obtained from the received signals, wherein at least one of the receivers (MS1) is a searching MS and wherein the calculation of location is carried out by the searching MS (MS1). The method may involve the target MS and the searching MS or MSs communicating by a direct mode of operation (DMO) link. The searching MSs may conveniently have GPS attachments. A mobile station which may be used as the target MS or as a searching MS and a system incorporating the same is also disclosed.

29 Claims, 3 Drawing Sheets

MOBILE COMMUNICATIONS STATIONS METHODS AND SYSTEMS

This application claims the benefit of prior filed copending international application Serial No. PCT/EP03/02221 filed Mar. 3, 2003, and assigned to Motorola, Inc., published as WO/ 03/083504 A1 on Oct. 9, 2003 and Great Britain application Serial No. 0207344.3 filed Mar. 28, 2002.

FIELD OF THE INVENTION

The present invention relates to mobile communication stations, methods and systems. In particular it relates to determination of the location of mobile stations.

BACKGROUND OF THE INVENTION

Mobile radio communications systems, for example cellular telephony or private mobile radio communications systems, typically provide for radio telecommunication links to be arranged between a plurality of subscriber units, often referred to in the art as mobile stations (MSs). The term mobile station (MS) generally includes both hand-portable and vehicular mounted radio communication units, radio-telephones and the like.

Mobile radio communications systems are distinguished from fixed communications systems, such as the public switched telephone networks (PSTN), principally in that mobile stations can move in geographical location to accompany their user and in doing so encounter varying radio propagation environments.

Mobile radio communications systems and mobile stations used in them may operate in one of two main modes, namely a trunked mode of operation (TMO) and a direct mode of operation (DMO). TMO communications use the infrastructure supplied by the system operator, especially base transceiver stations (BTSs), to deliver communications to and from the MS of each user or subscriber serviced by the system. Resources available in TMO are shared between the many MSs using the system. Systems operating in TMO are often referred to as cellular because a multiplicity of BTSs provide service to MSs in a network of overlapping regions known as cells. In contrast, DMO is a method that provides the capability of direct communication between two or more MSs without use of any associated operator's infrastructure. Some MSs may be dual mode operating using either TMO or DMO.

Methods are known for the location of a MS operating in a TMO cellular communication system to be determined. Such methods include a so-called TDOA or time difference of arrival method and a GPS (global positioning system) based method. The TDOA method involves sending signals from a given MS to at least three BTSs the locations of which are known precisely or receiving in a MS signals from at least three such BTSs. In the case where the signal from the MS is received by the three BTSs, using accurate time reference (GPS usually), and measurement of the transit delay for the signal to reach each BTS of the signal from the specific MS, the system can calculate the location of the MS.

In emergency situations, it should be possible to search for lost people who are accompanied by an active MS by estimating the location of the MS. Examples of situations where such searches are likely to be necessary include those needed where people become lost at sea or in a forest, or on mountain, or where they have become partially or totally buried following an explosion, avalanche etc. Unfortunately, the typical accuracy of the known location estimation methods which have been implemented in practice is only about several hundred metres and such method rely on the existence of a BTS infrastructure in the area where the search is to be made. In consequence, these known methods are of limited help where location precision much better than 100 metres is needed.

SUMMARY OF THE PRESENT INVENTION

According to the present invention in a first aspect there is provided a method for use in a mobile communication system for estimating the location of a target mobile station which includes receiving signals from the target mobile station at a plurality of receivers in different locations and calculating the location of the target mobile station from information obtained from the received signals, wherein at least one of the receivers comprises a searching mobile station and wherein the calculation of location is carried out by the searching mobile station using a method based upon time or time difference of arrival of signals travelling between the target mobile station and the plurality of receivers.

The method according to the invention desirably uses at least three receivers, including the said searching mobile station (MS), to receive signals from the target mobile station (MS). These receivers, additional to the searching MS, may be MSs which are operable to communicate with the said searching MS by direct mode of operation (DMO) links. Alternatively, one or two of these additional receivers could be a receiver of fixed location, e.g. in a base transceiver station (BTS). However, communications involving a BTS, i.e. by TMO, are inherently more complex than those which can be established between MSs by DMO, e.g. because in TMO different channels are employed for uplink and downlink communications and signals sent via a BTS generally have to travel longer distances which will introduce inaccuracies into the location determination procedure to be described. Thus, it is desired that at least one, preferably two, of these receivers, additional to the said searching MS, are also MSs which are operable to communicate with that MS by direct mode of operation (DMO) links. Where these three receivers are MSs, they are referred to herein as first, second and third searching MSs.

Similarly, it is possible for the radio signals from the target MS to be sent to the first searching MS by a TMO radio link. However, in this case, the complexity problem mentioned above again arises. Thus the radio signals from the target MS to the first searching MS are desirably sent by a DMO link.

Similarly, the signals sent by the target MS to one or both of the receivers other than the first searching MS, e.g. the second and third searching MSs, may involve a TMO link, even if the said receivers themselves are MSs, but desirably these signals are sent by a DMO link.

The receivers other than the first searching MS need to be connected to transmitters, e.g. in transceiver units comprising the second and third searching MSs, to communicate with the first searching MS in order to send to the first searching MS signals providing information relating to finding the location of the target MS.

The time or time difference of arrival method of determining location is known per se and is described for example in GB2368240B. The benefit of selecting such method for use as part of the method according to the invention is that the target mobile station does not need to have accurate time synchronisation with the receivers including the searching mobile station(s) although these receivers desirably have accurate time synchronisation themselves, e.g. by synchronisation with an external synchronisation clock such as the clock of the GPS (Global Positioning System) by including GPS receivers in association with the receivers.

In the method according to the invention, the first, second and third searching MSs may be operable in a search mode whereby these MSs co-operate to apply a procedure to determine the location of the target MS in one of the ways described herein. Such a mode may be initiated in each MS by a user applying a suitable control signal to the MS, e.g. via a control button or a soft or hard key of a keypad or a voice operated command. A GPS attachment may be used in conjunction with one or more of these MSs to assist the location and synchronisation procedure. One of these MSs, selected either by decision making logic functions of the MSs themselves or manually by the user of one of the MSs, may be designated as the lead MS. The lead MS may issue a signal indicating that the search procedure is to begin and may later in the procedure carry out calculations to estimate the location of the searched for target MS. In the method as specified earlier the first searching MS is designated as the lead MS. The signal issued by the first searching MS as lead MS to initiate the search procedure, e.g. as a polling or interrogation signal, may be a broadcast signal. All MSs within range which are active (switched on) and operate according to the same communication protocol as used in the signalling sent by the first searching MS may recognise the signal and respond by sending a return signal accordingly. The second and third searching MSs may be programmed to be prevented from responding when they are set to be in the search mode. The lead MS, namely the first searching MS, may be operable to select only one responding MS (at a time) e.g. the responding MS sending the strongest signal in the correct protocol, as the MS to be searched for. This may be achieved by the first searching MS sending a signal to the unselected MSs to prevent further response signals in a given period from those MSs. In this method, as described earlier, the searched for MS is the said target MS.

In the method according to the invention, the target MS is desirably operable to send to the first searching MS and at the same time to the other receivers one or more signals recognised by the first searching MS and the other receivers as signals which can be employed in a location estimation procedure. This signal or signalling by the target MS may be in response to the signal issued by the first searching MS as lead MS in the search procedure of the first, second and third MSs. The signal may however be generated automatically and periodically by the target MS.

Alternatively, when possible, the signal(s) sent by the target MS may be initiated by a user of the target MS applying a control function instruction thereto, e.g. via a control button or a soft or hard key of a keypad or a voice activated control.

The signal sent by the target MS is employed in the method according to the invention to provide measurement of the relative distances of the first searching MS and the other receivers from the target MS. Such distances are measured by a known time of arrival or time difference of arrival method, e.g. in the manner described later. The instant in time when the signal or a recognised component part thereof, e.g. the start of a particular time slot, is sent by the target MS, is desirably labelled by a code in the signal. Such a code may conveniently be recognised by the receivers including the first searching MS whereby the time of receipt of the same signal by the receivers including the first searching MS can be accurately recorded. The target MS may issue two or more signals each having a different labelled code to assist the location procedure.

According to the present invention in a second aspect there is provided a mobile station which is operable as the target MS or as the first, second or third searching MS in the method according to the first aspect.

In a particular form of the mobile station according to the second aspect, wherein the mobile station is to be used as the first searching MS, the MS has an electro-optical display and is operable to show on the electro-optical display graphical information of the estimated position co-ordinates of the target MS as calculated in the said method by the first searching MS, optionally together with graphical information of the estimated position co-ordinates of one or more of the searching MSs.

Thus the present invention provides a new method and a mobile station for use therein which allows determination of the location of a target mobile station accompanying a lost person to be made more accurately than in the prior art and beneficially allows searching in areas in which no nearby BTS infrastructure is present. The invention is particularly suitable for use in a communication system and method operating according to TETRA (TErrestrial Trunked Radio) standards are known. The TETRA standards are operating protocols which have been defined by the European Telecommunications Standards Institute (ETSI).

Embodiments of the present invention will now be described by way of example with reference to the accompanying drawings in which:

BRIEF DESCRIPTION OF THE ACCOMPANYING DRAWINGS

DESCRIPTION OF EMBODIMENTS OF THE INVENTION

Figure 1:
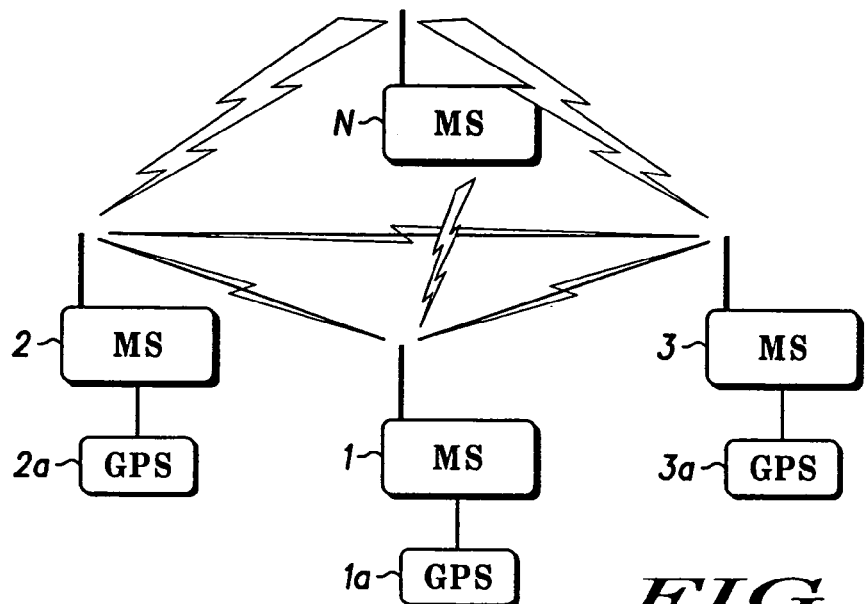
FIG. 1 is a schematic illustration of an arrangement of three mobile radio stations being used to search for a further a target mobile radio station in a method embodying the invention.

As illustrated in FIG. 1, a search is taking place for a lost person having a MS (mobile station) N (e.g. a mobile telephone). Using the mechanisms and procedures described below, MSs (mobile stations) 1, 2 and 3 (e.g. mobile telephones) being carried by helpers searching for the user of MS N are used to detect the location of MS N to find the missing person. For the purpose of the location detection, each of MSs 1, 2 and 3 is equipped with a GPS attachment is connected to the MS providing the MS with an accurate measurement of its own position co-ordinates and with an accurate time reference. These GPS attachments are receivers labelled GPSs 1a, 2a and 3a respectively in FIG. 1. Such attachments are known per se in the mobile telephony field.

The GPS attachments do not have to be permanently connected to the mobile stations. They may be employed as an add-on accessory that is used only in emergency cases such as when the mobile stations are being employed in a search operation.

There can be more than three mobile stations used in the search procedure, to allow more accurate measurements. However, three mobile stations are enough to put the invention into practice. Throughout this embodiment of the invention, it will be assumed that DMO signalling is used according to the TETRA (Terrestrial Trunked Radio) standards. This is a set of operational standards for modern digital RF communications systems specified by the ETSI (European Telecommunications Standards Institute). It should be noted, however, that the invention is applicable for use in other systems for direct radio-to-radio interfaces between the mobile stations.

A procedure for searching for MS N involves the following steps:

A: Initiating Signalling from MS N

It is necessary for MS N to issue radio signalling by which MSs 1, 2 and 3 can determine its location. Although it is possible that the person holding MS N could operate MS N to cause it to initiate a signal, e.g. by operating a button, key or voice controlled device to carry out a suitable control function, it is more likely that this will not be possible in most cases, e.g. because the person being searched for is unconscious. It is also assumed that MS N is not able to provide continuous transmission of the appropriate signalling because of the energy drain on the battery this would require in currently available terminals. Therefore, a polling mechanism provided by the searching mobile stations MS 1, 2 and 3 will normally be required. A polling signal needs to be generated and sent. This is carried out by MS 1 whose user is leading the search operation. The purpose is to cause MS N which is assumed to be switched on but in a standby state to recognise the content of the polling signal in its processing and memory functions. In response, MS N will automatically generate and transmit the required location assisting signalling. The polling signal sent by terminal MS 1 can be directed to a specific mobile station (in this case it is known that MS N is missing) or sent by broadcast to any mobile stations in the area which can recognise the polling signal. In the latter case, several responses may be received. For the purposes of this embodiment of the invention, it is assumed that the search is for a specific mobile station, i.e. MS N.

B. Receipt of Signalling from MS N by the Other Mobile Stations MS 1, MS 2 and MS 3

Receipt of the signalling from MS N by MSs 1, 2 and 3 allows the MSs 1,2 and 3 to measure the precise 'receive time' (also known as 'time of arrival') when a given component of the signalling is received by each of the mobile stations MSs 1, 2 and 3 as described earlier.

C. Transmitting by Mobile Stations MS 2 and MS 3 to MS 1

The recorded receive times by MSs 2 and 3 together with the position co-ordinates of those MSs obtained using the GPS attachments 2a and 3a respectively of those MSs is transmitted to lead mobile station MS 1. MS 1 then has the receive time measurements and location co-ordinates for all three searching MSs 1, 2 and 3.

D. Calculating by MS 1

The relative distances from MS N of the MSs 1,2 and 3 are proportional to the respective receive times by those mobile stations. Also, MS 1 has the position co-ordinates of each of MSs 1, 2 and 3. From these various measurements, MS 1 is able to calculate the location of terminal 1.

A more detailed description of the procedure which may be used to determine the location of MS N is as follows:

A1: Initiating Signalling from MS N

One of the searching mobile stations, MS 1, is designated as search lead terminal and transmits a "Search Polling Request" (SPRq) command. The command is either directed specifically to MS N or is broadcast to all mobile stations in the area. The other MSs that are participating in the search, i.e. MSs 2 and 3, were set at the start of the search procedure to a search co-operation mode by entry of an appropriate function signal by their users. In that mode, the MSs 2 and 3 are set so that they do not respond to the SPRq command. MS 1 is aware, by entry of information by its user, that MSs 2 and 3 are set to the search co-operation mode.

When MS N receives and understands the SPRq command, it responds with a 'Search Polling Reply' (SPRy) message. The content of the SPRy message may contain a 'counter' to number the messages, although other parameters, such as frame and slot number, may beneficially be used to uniquely identify when a particular message is sent, i.e. to give the message a unique identity (ID). The SPRy message, with different message ID labels according to when each is sent, may be repeated several times to make sure the searching mobile stations, in this case MSs 1,2,3, receive it. The number of times it is repeated may be selected as follows. Some options are:

The SPRq command includes the number of times the SPRy message should be repeated and the time between repetitions.

The SPRq command includes the period of time when the message should be repeated and the time between repetitions.

The above parameters may be pre-defined in MS N.

In the case where several MSs respond to the SPRq command, MS 1 can select one of the MSs to continue searching for and instruct (by a special command signal issued by MS 1 when detecting such responses) the responding MSs other than the selected one to stop transmitting. It will be assumed that in this case the selected MS is MS N. The search procedure will then proceed only for MS N. This procedure can then be repeated later, after MS N has been located, for locating the other mobile stations.

B1: Receipt of Signalling from MS N

When MS N transmits the SPRy message, MSs 1 2 and 3 receive it. They all record the ID of the message (e.g. the "counter" of the frame/slot number) and the time the message was received. MSs then send this information to the MS which initiated the SPRq command, i.e. MS 1, using a "Search Polling Reply Data" (SPRd) message. The SPRd message also contains the position co-ordinates obtained from GPS attachments 2a and 3a of the MSs 2 and 3. This procedure is repeated for each received SPRy message.

C: Transmission of Receipt Time by MSs 2 and 3 to MS 1

The MSs 2 and 3 may be operable to send a signal, whose content is recognised by MS 1, giving measurement information relating to the search method, including the x and y position co-ordinates of MSs 2 and 3 and the respective receive times of given signals from MS N.

D1: Calculation of MS N's Location by MS 1

When MS 1 has received the SPRd messages from MSs 2 and 3, it initiates a procedure to perform the calculation of MS N's location, e.g. as described further below, using the data received from MSs 2 and 3 and the data it received from MS N. After the first iteration of this procedure, the calculation may not be accurate enough or may not be optimised. In this case, the user of MS 1 may instruct the users of MSs 2 and 3 to change positions (and of course MS 1 can change its position also). This instruction can be made by sending radio messages to the MSs 2 and 3 for the attention of their users, e.g. by short text message and display at the receiving MS, or by speech message (or any other way). The position change instruction may also contain the desired new location of the MS as calculated by MS 1 (e.g. 'move 30 metres to the north').

The position of MS N may be determined by triangulation. One well-known implementation of triangulation is based on the Time Difference of Arrival (TDOA) of radio signals at the MSs 1, 2 and 3. MS 1 can, with the information received by itself and gathered from MSs 2 and 3, calculate differences in receive time of the searching MSs considered in pairs.

If T1, T2 and T3 denote the time of arrival of a signal transmitted by MS N by MSs 1, 2 and 3 respectively, MS 1 can calculate the differences T12=T1-T2 and T13=T1-T3. Calculating these differences will reduce errors in T1, T2 and T3 common to all searching MSs. By multiplying the differences T12 and T13 by the speed of light, MS 1 can calculate the corresponding difference in distance (from MS N) between MSs 1 and 2 and between MSs 1 and 3 respectively. These distances will be denoted as R12 and R13 respectively, and are known as pseudo-ranges.

Since all of the MSs 1,2 and 3 are likely to be situated in a small geographical area, it can be assumed that the receivers of their GPS attachments 1a, 2a, 3a are locked to the same satellite constellations. Errors in GPS measurement have two components: a random component that is due, for example, to the signal-to-noise ratio of the signal received and a 'bias' component due to the geometries involved in the measurements and positions of satellites. By using time differences T12 and T13, the contribution of the bias component which is similar for all MSs is cancelled out.

Assume that $(x_i, y_i)$, i=1, 2, 3 denote the planar coordinates of MSs 1, 2 and 3, known to MS 1 by the measurements described above. The differences R12 and R13 express the loci of points where the difference of distance to MS N is constant. This is a hyperbola. If $(x_n, y_n)$ denote the co-ordinates of MS N, then it is true that $$\sqrt{(x_n-x_1)^2+(y_n-y_1)^2} - \sqrt{(x_n-x_2)^2+(y_n-y_2)^2} = R12$$

$$\sqrt{(x_n-x_1)^2+(y_n-y_1)^2} - \sqrt{(x_n-x_3)^2+(y_n-y_3)^2} = R13$$

This constitutes a non-linear set of equations, which will be referred to as Equations 1 and 2, that can be solved by computation by MS 1. Equations 1 and 2 can be solved using linearisation techniques and an iteration method where an initial guess for $(x_n^0, y_n^0)$ is made and this guess is refined in successive iterations. The method for obtaining this mathematical solution is analogous to that known in the prior art for TMO systems.

Since all of the MSs 1,2 and 3 are likely to be situated in a small geographical area, it can be assumed that the receivers of their GPS attachments 1a, 2a, 3a are locked to the same satellite constellations. Errors in GPS measurement can occur and have two components: a random component that is due, for example, to the signal-to-noise ratio of the signal received and a 'bias' component due to the geometries involved in the measurements and positions of satellites.

Thus, the position co-ordinates given by the GPS in general are not precise and there could be an error of say $(\Delta x, \Delta y)$. This error will manifest itself in the precision of determining the position of terminal N.

If $(\Delta x, \Delta y)$ is the error of the GPS positioning of MSs 1, 2 and 3, it can be assumed that it is the same for all mobile stations. Taking into account the error $(\Delta x, \Delta y)$ Equation 1 that is being solved by MS 1 can then be written in the form:

$$\sqrt{(x_n-x_1+\Delta x)^2+(y_n-y_1+\Delta y)^2} - \sqrt{(x_n-x_2+\Delta y)^2+(y_n-y_2+\Delta y)^2} = R12$$

and Equation 2 can be written in a similar form. Assuming that $\Delta x^2, \Delta y^2 \sim 0$ and that $((x_n-x_1)^2 >> 2\Delta x(x_n-x_1)$ and taking into account that $$\sqrt{z+\varepsilon} \approx \sqrt{z} + \frac{\varepsilon}{2\sqrt{z}},$$

it can be shown that $\sqrt{(x_n-x_1)^2+(y_n-y_1)^2} - \sqrt{(x_n-x_2)^2+(y_n-y_2)^2} = R12+\Delta R12$ Equation 3, where $$\Delta R12 = \left( \frac{(x_n-x_1)}{\sqrt{(x_n-x_1)^2+(y_n-y_1)^2}} - \frac{(x_n-x_2)}{\sqrt{(x_n-x_2)^2+(y_n-y_2)^2}} \right) \Delta x + \left( \frac{(y_n-y_1)}{\sqrt{(x_n-x_1)^2+(y_n-y_1)^2}} - \frac{(y_n-y_2)}{\sqrt{(x_n-x_2)^2+(y_n-y_2)^2}} \right) \Delta y$$

Equation 4

That is, from the standpoint of the computation, $\Delta R12$ is equivalent to an additional error in the measured pseudo-range. Assuming that MSs 1, 2 and 3 are located at the apexes of an equilateral triangle whose sides are equal to 300 metres and assuming that the accuracy of the GPS position measurement is about 1 meter, the value $\Delta R12$ is of the order of 1.5 metres.

Figure 2A:
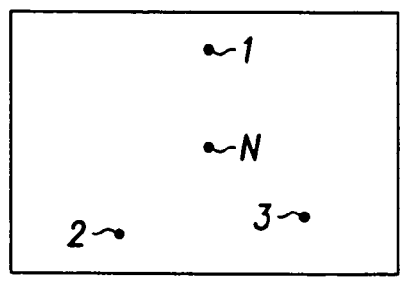
FIGS. 2a and 2b are illustrations respectively of good and bad arrangements of searching mobile stations being used in the method illustrated in FIG. 1.
Figure 2B:
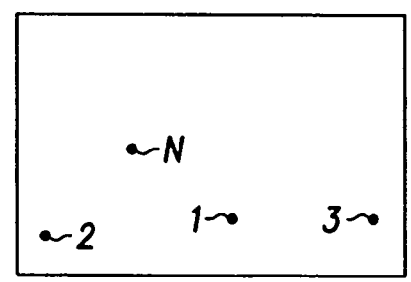

One of the advantages in performing this computation using the linearisation technique expressed above is that one of the steps involves the computation of the so-called co-factor matrix defined in the following website publication (http://www.gmat.unsw.edu.au/snap/gps/gps survey/ chap1/1 49.htm). This co-factor matrix permits the computation of what is known as Geometric Dilution of Precision (GDOP). In simple terms, GDOP represents the ratio between the error that will be achieved in the estimation of the required position to the optimal error that can be achieved. The GDOP in implementing this embodiment of the invention is very dependent on the relative positions of MSs 1,2 and 3 and MS N. If the MSs 1,2 and 3 are well distributed with respect to MS N, i.e. ideally to form an equilateral triangle with MS N at the centre, then the GDOP will be low whereas if they are not evenly distributed, the GDOP will be high. This is illustrated graphically in FIGS. 2(*a*) and (*b*). FIG. 2(*a*) illustrates an arrangement of mobile stations MS N, 1, 2 and 3 (now shown as small circles)

which gives a low value of GDOP. In contrast, FIG. 2(b) illustrates an example of an arrangement of mobile stations MS N, 1, 2 and 3 which gives a high value of GDOP.

In the steps needed to solve Equations 1 and 2 using a linearisation approach, known from GPS and TDOA calculations for example, an MS (MS 1) can compute a value for GDOP for the particular calculation. Thus, the GDOP value obtained for a given calculation is calculated and used to improve the positions of MSs 1, 2 and 3 with respect to each other and to MS N. In a typical procedure using the measured GDOP value, a very coarse search can be carried out initially. MS 1 carries out a location computation and determines that the GDOP value is large. An instruction can then be sent by the user of MS 1 to the users of either or both of MSs 2 and 3 to move, to perform new measurements and to resend their co-ordinates and receive time measurements to MS 1 to see if a better GDOP value can be achieved. This procedure may be repeated iteratively until a minimum acceptable value of GDOP is attained.

Graphical (Analytical) Method for Improving GDOP

Once R12 and R13 have been measured, assuming that all the measurements are exact, hyperbolae can be constructed which are the solutions in the xy plane to Equations 1 and 2. From R12, there is obtained a set of points $(x_1,y_1)$ $(x_2,y_2)$, etc which follow a hyperbola representing the set of geometric positions for all potential solutions for $(x_n,y_n)$. Similarly the hyperbola obtained using R13, points defined by $(x_1,y_1)$, $(x_3,y_3)$ etc represent the set of geometric positions for all potential solutions for $(x_n,y_n)$. The intersection point of these two hyperbolic curves is the first estimation for the co-ordinats of MS $N(x_n,y_n)$.

Figure 3A:
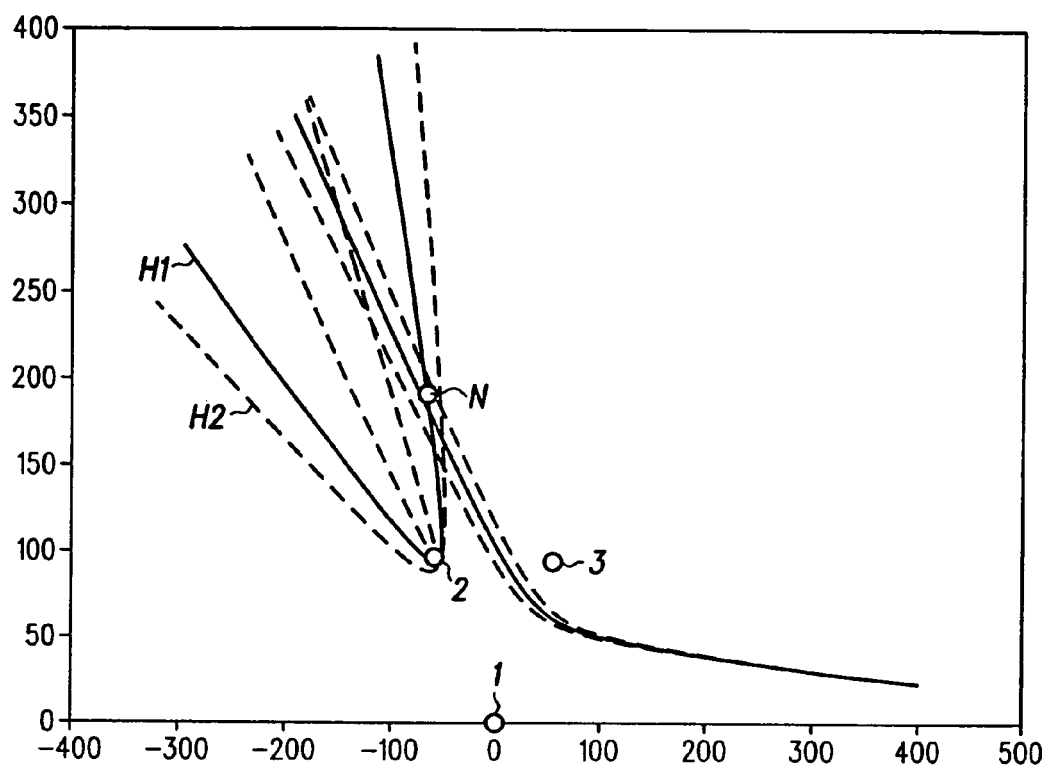
FIGS. 3a and 3b are graphical hyperbolic plots of possible position co-ordinates of mobile stations obtained from a first measurement iteration of measured distances between pairs of the mobile stations taking part in the search method illustrated in FIG. 1.
Figure 3B:
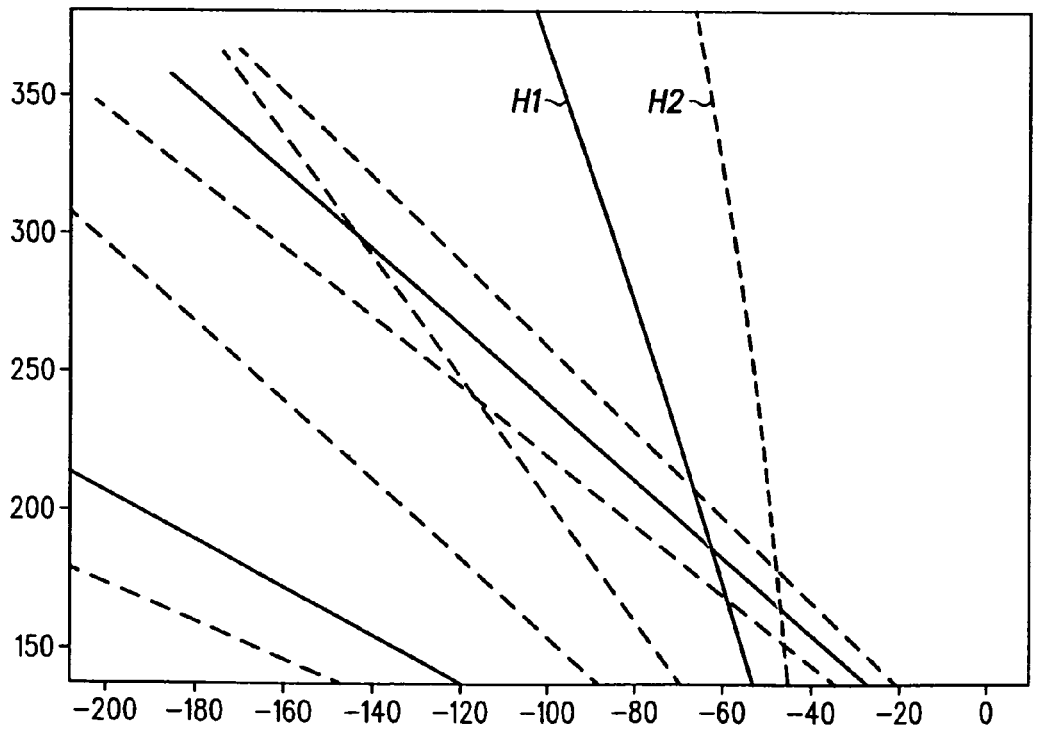

This is illustrated in FIGS. 3a and 3b. In FIG. 3a the positions of the MSs 1,2,3 and N are represented as small circles labelled 1,2,3 and N respectively. Thus, the unknown position to be determined is N. The solid black curves labelled H1 are the hyperbolic exact geometric positions. The dashed curves labelled H2 are the worst-case combinations for the following measurement errors: $\Delta x=\pm 1$, $\Delta y=\pm 1$, $\Delta R12=\pm 2$, $\Delta R13=\pm 2$. (The units may be taken as metres.)

FIG. 3b is obtained in the same way as FIG. 3a, with zooming in the uncertainty region. Once the graph in FIGS. 3a and 3b has been computed by terminal 1 the graph can be displayed on a display by MS 1 in a known manner. Electro-optical displays which can display a graph of y co-ordinates plotted against x co-ordinates of a plotted function are known per se. The display may for example be a matrix addressed liquid crystal display. It will then be seen from the displayed graph by the user of MS 1 that MSs 1, 2 and 3 should be moved in a way such that the initially estimated position is in the centre of a triangle formed by the MSs 1,2 and 3 at the apexes. For this new arrangement new measurements are taken for R12 and R13. Using the new values of R12, R13, $(x_1,y_1)$, $(x_2,y_2)$ and $(x_3,y_3)$ a refined solution is found for $(x_n,y_n)$. This is shown in FIGS. 4a and 4b.

Figure 4A:
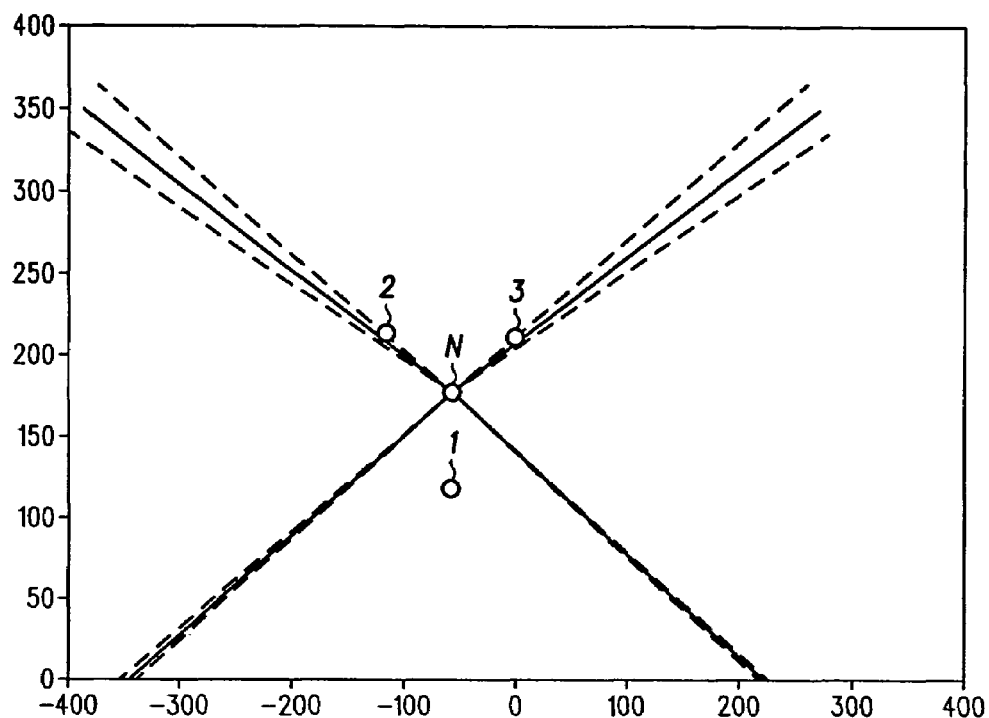
FIGS. 4a and 4b are plots similar to those shown in FIGS. 3a and 3b for a later measurement iteration of the measured distances.

Thus, in FIG. 4a the searching MSs 1, 2 and 3 have been moved to positions which give a better GDOP value than the first location iteration.

Figure 4B:
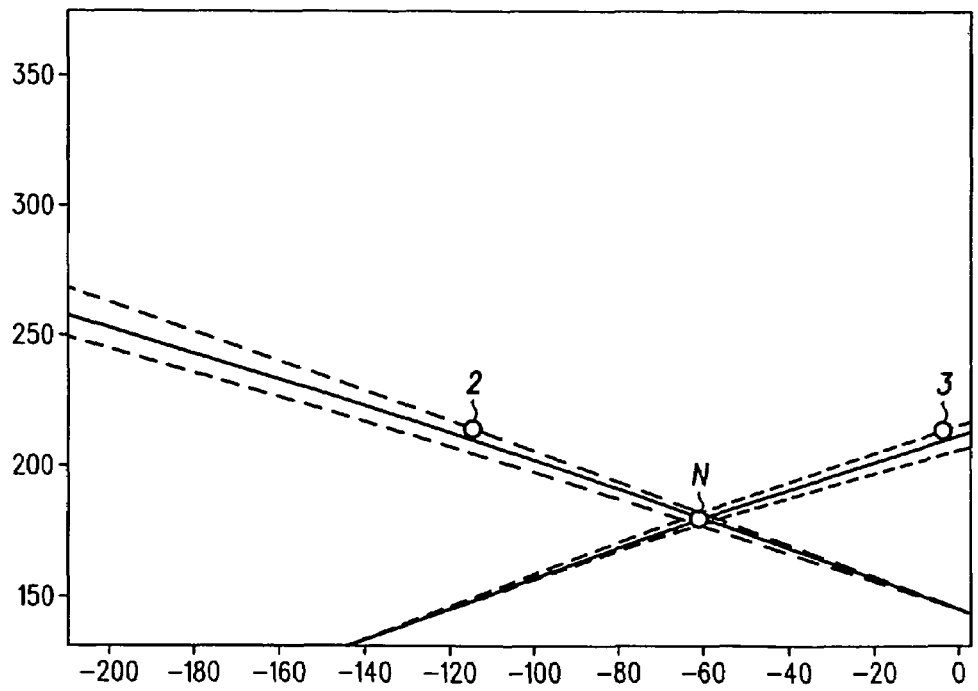

FIG. 4b is derived from the same measurements as FIG. 4a, but with zooming in the uncertainty region. The scaling factor used in the zoomed versions in FIGS. 3b and 4b has been kept the same in order to illustrate the improvement obtained by FIG. 4b.

Qualitative comparison of FIGS. 3b and 4b shows that the GDOP value or uncertainty factor has been improved in FIG. 4b. In practice, several more iterations of the procedure may be made, using each time refinement of the positioning of the MSs 1, 2, and 3, until a minimum acceptable value of GDOP has been obtained. Usually, the triangle formed by the positions of MSs 1,2,3 is reduced in size for each iteration. Once the minimum GDOP is found, the procedure is stopped and the position of terminal N should be apparent to the users of terminals 1,2,3. Extra assistance, e.g. using sniffer dogs, may be used in the search for the user of MS N at this stage.

The Effect of Disregarding Altitude

In the description of the location determination procedure which has been described above, especially with reference to FIGS. 2a to 4b, it has been assumed that all the MSs are at the same altitude, i.e the same z component in an x,y,z three dimensional Cartesian co-ordinate system. However, in practice variation in z component between the MSs is an additional source of error. However, we have carried out simulation analyses to investigate the effect of this variation. These simulation results have shown that unless the altitude differences are of the order of the distances between the MSs, the effect is negligible. For example, if the average distance between the MSs 1,2,3 is about 100 metres, altitude differences of +/−10 metres result in negligible deviation of the two dimensional solution (in which all altitudes are taken as 0) as compared with the exact three dimensional solution (in which actual altitudes taken into account). In extreme cases, where it is clear that the deviations cannot be neglected, one or more of the searching MSs 1,2,3 can be elevated to form a triangle for which the altitude differences are reduced or eliminated, and/or more than three co-operating searching MSs may be employed.

The invention claimed is:

1. A method for use in a mobile communication system for estimating the location of a target mobile station which comprises:

receiving signals from the target mobile station at a plurality of receivers in different locations and calculating the location of the target mobile station from information obtained from the received signals, wherein the plurality of receivers comprise first, second and third searching mobile stations, wherein the calculation of location is carried out by the first searching mobile station using a method based upon one of time of arrival and time difference of arrival of signals traveling between the target mobile station and the plurality of receivers, and wherein the first, second, and third mobile stations are operable to communicate with each other by a direct mode of operation (DMO) link.

2. A method according to claim 1 wherein at least three receivers, including the searching mobile station, are employed to receive signals from the target mobile station.

3. A method according to claim 2 wherein at least one of the receivers, additional to the searching mobile station, is a receiver of fixed location and communications to or from the receiver of fixed location are by a trunked mode of operation.

4. A method according to claim 1 wherein the target mobile station is operable such that radio signals from the target mobile station to be sent to each searching mobile station is sent by a trunked mode of operation (TMO) radio link.

5. A method according to claim 1 wherein the target mobile station is operable to communicate with the first, second and third searching mobile stations by a direct mode of operation (DMO) link.

6. A method according to claim 1 wherein the first, second and third searching mobile stations comprise transceivers operable to communicate with one another, the second and third searching mobile stations being operable to send to the first searching mobile station signals providing information relating to finding the location of the target mobile station.

7. A method according to claim 1 wherein the first, second and third searching mobile stations are operable in a search mode whereby these mobile stations co-operate to apply a procedure to determine the location of the target mobile station.

8. A method according to claim 7 wherein the search mode is initiated in each of the searching mobile stations by a user of each respective station applying thereto a control signal.

9. A method according to claim 1 wherein each of the first, second and third searching mobile stations is provided with position measuring means to determine its own position and time reference means to provide an accurate time reference.

10. A method according to claim 9 wherein the position measuring means and the time reference means comprise a GPS (global positioning system) receiver incorporated in or attached to the searching mobile station.

11. A method according to claim 1 wherein the first searching mobile station is designated as a lead searching mobile station and the second and third searching mobile stations are designated as co-operating stations in the search mode.

12. A method according to claim 11 wherein the first searching mobile station is operable to issue a signal indicating that the search procedure is to begin.

13. A method according to claim 11 wherein the first searching mobile station is operable to issue at least one of a polling and interrogation signal to search for the target mobile station.

14. A method according to claim 13 wherein the at least one of a polling and interrogation signal is issued as a signal broadcast to relevant mobile stations within range.

15. A method according to claim 14 wherein the first searching mobile station is operable to receive signals from the relevant mobile stations that have received the broadcast signal and to select one of the relevant mobile stations as the target mobile station.

16. A method according to claim 14 wherein the second and third searching mobile stations have been programmed to be prevented from responding to the broadcast signal when they are set to be in the search mode.

17. A method according to claim 15 wherein the first searching mobile station is operable to send a signal to the unselected mobile stations to prevent further response signals in a given period from those stations.

18. A method according to claim 1 wherein the target mobile station is operable to send to the first, second and third searching mobile stations at least one signal recognized by the first, second and third searching mobile stations as at last one signal which can be employed in a location estimation procedure.

19. A method according to claim 18 wherein the at least one signal from the target mobile station is sent in response to a signal issued by the first searching mobile station as lead mobile station in the search procedure of the first, second and third searching mobile stations.

20. A method according to claim 18 wherein the at least one signal sent by the target mobile station is generated automatically and periodically by the target mobile station.

21. A method according to claim 18 wherein the at least one signal sent by the target mobile station is initiated by a user of the target mobile station applying a control function instruction thereto.

22. A method according to claim 18 wherein the at least one signal sent by the target mobile station is employed to provide measurement of the relative distances of the first, second and third searching mobile stations from one another and from the target mobile station.

23. A method according to claim 1 wherein an instant in time when each signal, or a recognized component part thereof, sent by the target mobile station is labeled by an identity code in the signal, such code being recognized by the first, second and third searching mobile stations whereby the time of receipt of the same signal by those stations can be accurately recorded.

24. A method according to claim 21 wherein the target mobile station issues at least two-signals each having a different labeled code to assist the location procedure.

25. A method according to claim 1 wherein the first searching mobile station is operable to calculate the co-ordinates of two sets of points each set defining a hyperbola curve representing possible solutions to equations defining the positions of the searching mobile stations obtained using the time difference of arrival method as applied to pairs of the searching mobile stations.

26. A method according to claim 25 wherein the first searching mobile station has an electro-optical display and is operable to show on the display the hyperbola curves, the estimated location of the target mobile station being at the intersection of the hyperbola curves.

27. A method according to claim 1 wherein the method operates in accordance with TETRA standards.

28. A mobile station which is operable as a first searching mobile station in the method according to claim 1 and has an electro-optical display and is operable to show on the electro-optical display graphical information of the estimated position co-ordinates of the target mobile station as calculated in the said method by the first searching mobile station.

29. A mobile station according to claim 28, wherein first searching mobile station is also operable to show on the electro-optical display with graphical information of the estimated position co-ordinates of the at least one searching mobile stations.

* * * * *